No. 686,494. Patented Nov. 12, 1901.
M. VOIGT.
HOG DRESSING RACK.
(Application filed Jan. 14, 1901.)
(No Model.) 2 Sheets—Sheet 1.
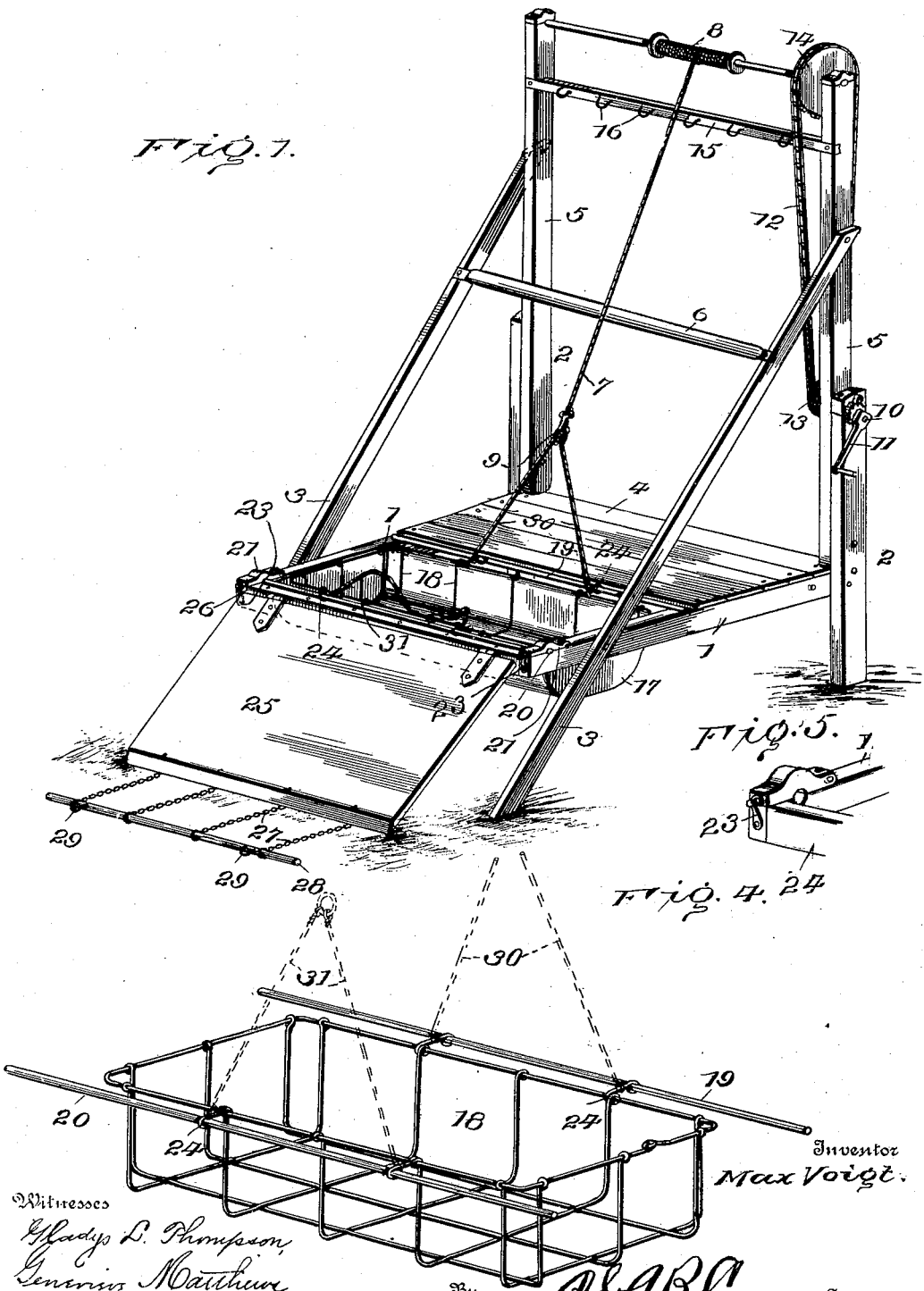

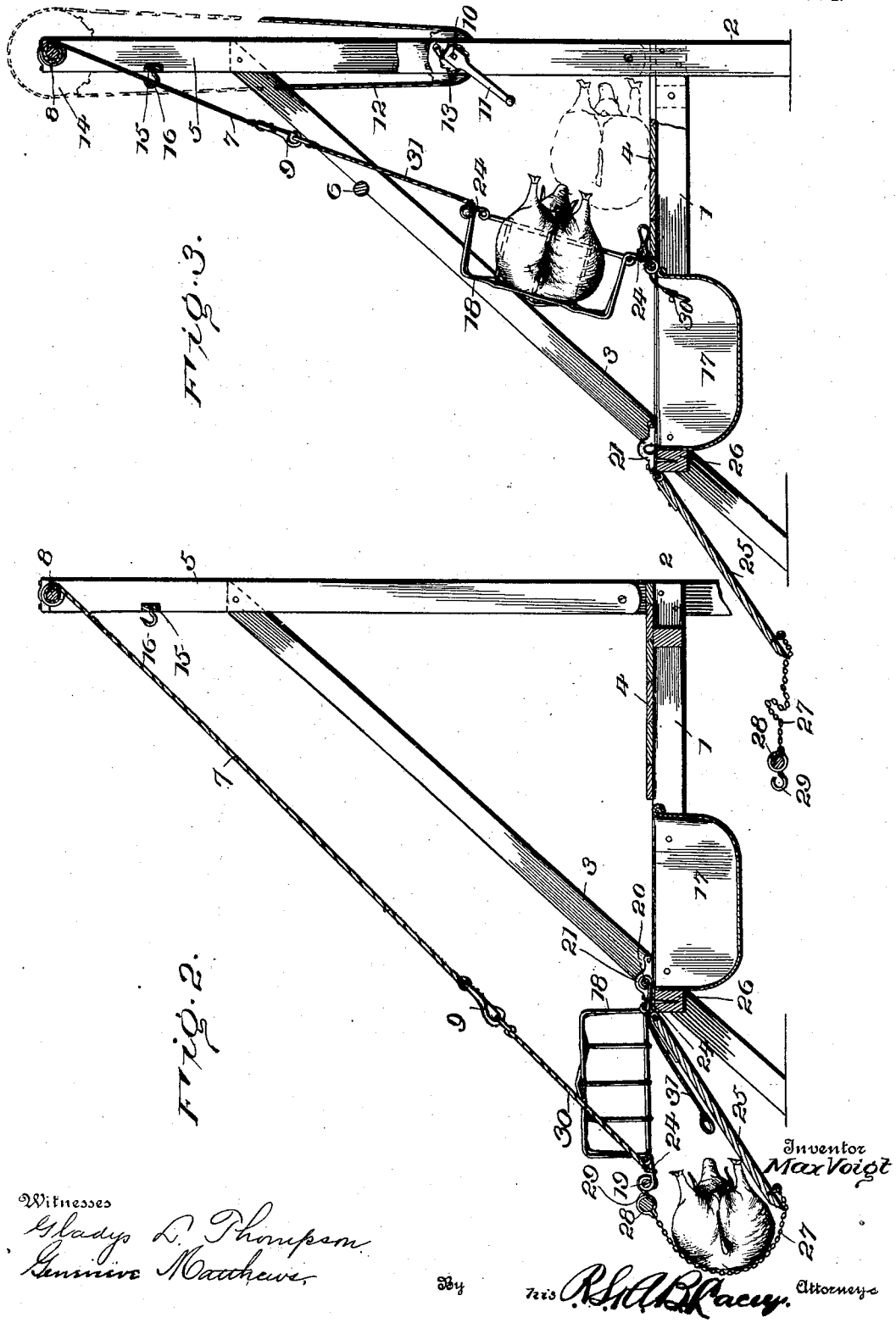

UNITED STATES PATENT OFFICE.

MAX VOIGT, OF EMMETSBURG, IOWA.

HOG-DRESSING RACK.

SPECIFICATION forming part of Letters Patent No. 686,494, dated November 12, 1901.

Application filed January 14, 1901. Serial No. 43,233. (No model.)

*To all whom it may concern:*

Be it known that I, MAX VOIGT, a citizen of the United States, residing at Emmetsburg, in the county of Palo Alto and State of Iowa, have invented certain new and useful Improvements in Hog-Dressing Racks; and I do hereby declare the following to be a full, clear, and exact description of the invention, such as will enable others skilled in the art to which it appertains to make and use the same.

This invention relates to butchering appliances for handling the animal after being slaughtered, the purpose being to secure greater safety to the operator during the scalding process, especially when lowering the animal into the scalding-trough and removing it therefrom.

For a full description of the invention and the merits thereof, and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of the apparatus or rack. Fig. 2 is a vertical longitudinal section showing the manner of dumping the animal into the basket. Fig. 3 is a view similar to Fig. 2, showing the manner of dumping the animal onto the fixed platform for dressing. Fig. 4 is a perspective view of the basket. Fig. 5 is a detail view of the front end portion of a sill, showing the block hinged thereto and fastenings therefor.

Corresponding and like parts are referred to in the following description and indicated in all the views of the drawings by the same reference characters.

The base of the structure comprises longitudinal sills 1, posts 2, braces 3, extended to form legs for the front ends of the sills 1, and the rear platform 4, secured to an end portion of the sills 1. Uprights 5 are attached at their lower ends to the posts 2 and are stayed by having the upper ends of the braces 3 connected thereto. A cross-bar 6 connects the braces 3 a short distance from their upper ends and gives direction to the operating-rope 7 when lowering the animal into the scalding-trough. A windlass 8 is journaled to the upper ends of the parts 5 and one end of the operating-rope 7 is attached thereto, the opposite end of said rope being provided with a snap-hook 9 or analogous device to enable the rope 7 to be detachably connected with the rope of the basket. A shaft 10 is journaled in one of the posts 2 and the upright adjacent to said post, and the outer end of the shaft is provided with a crank 11 and the usual ratchet-wheel and pawl for holding the shaft against backward rotation. A drive-chain 12 connects a sprocket-wheel 13 with a sprocket-wheel 14, attached to an end portion of the windlass, and serves to transmit motion from the shaft 10 to the windlass for winding the operating-rope 7 thereon when required. It is to be understood that the windlass 8 may be operated in any desired way; but for convenience the instrumentalities shown are preferred. A transverse bar 15 connects the upper end portions of the uprights 5 and is provided with pins or hooks 16 to receive either the animal or parts thereof either before, subsequent to, or during the process of dressing. In the event of the animal being too heavy and bulky for convenient handling it may be drawn up to the pins or hooks by means of the operating-rope through the intervention of the windlass, as will be readily comprehended.

The scalding-trough 17 is located in front of the platform 4 and is attached to the front end portions of the sills 1, adjacent to the braces 3. A basket 18 of a size to fit comfortably within the scalding-trough has pivot-bars 19 and 20 attached to its sides in any substantial manner and spaced therefrom, the end portions of the pivot-bars projecting beyond the ends of the basket and scalding-trough, so as to overlap the longitudinal sills 1. The rear pivot-bar 19 is adapted to rest against the front edge of the platform 4. Bearing-blocks 21 are adapted to engage over the end portions of the front pivot-bar 20 and hold it in place during the forward and backward tilting of the basket, as will appear more fully hereinafter. These bearing-blocks 21 are hinged at their rear ends to the sills 1, and hooks 23 or equivalent means are provided to hold the front ends of the bearing-blocks in position when the basket is turning upon the pivot-bar 20 as an axis. While any suitable means may be employed for attaching the pivot-bars to the basket, the construction illustrated is preferred, because of the simplicity and absence of joints. The end portions of certain of the transverse wires or rods forming the basket are extended, as shown at 24, and the outer ends of these extended wires are bent to embrace the pivot-bars. It will thus be seen that by having the connections 24 form integral extensions of elements of the basket they are not liable to turn upon the edge wire, and bracing means need not be provided.

A platform 25 is pivoted to a cross-timber 26, connecting the front ends of the sills 1, and an apron is made fast to the front end of the said pivoted platform and consists of a series of chains, cords, or analogous devices 27 and a connecting-rod 28, the latter uniting the front ends of the parts 27 and having hooks 29 near its ends. The platform 25 normally inclines forward and downward, thereby permitting the apron to be stretched upon the ground or surface upon which the apparatus may be placed.

When it is required to use the apparatus, scalding water is applied to the trough 17 and the apron is stretched out upon the ground and receives the animal previously slaughtered. The operating-rope 7 is passed over the cross-bar 6 and connected with the inner side of the basket, preferably by means of a rope 30, which has its ends connected to the parts 24 and its middle portion provided with a ring into which the snap-hook 9 is engaged. By operating the windlass the rear portion of the basket is elevated and the basket caused to turn upon the pivot-bar 20, thereby facilitating the turning of the basket toward the pivoted platform 25. After the basket has been elevated as much as possible by winding the rope 7 upon the windlass it is assisted past the vertical in any desired way, the rope 7 being slackened by turning the windlass backward, thereby permitting the basket to settle upon the pivoted platform. The hooks 29 of the rod 28 are engaged with the end portions of the pivot-bar 19 after the operating-rope 7 has been sufficiently slackened to admit of the complete turning of the basket upon the platform 25. After the engagement of the apron with the rear portion or pivot-bar 19 of the basket the windlass 8 is operated to elevate the animal and to turn the basket and platform 25 rearward until the parts pass the perpendicular, when the animal will roll into the basket and is lowered into the scalding-trough by operating the windlass to admit of the unwinding of the operating-rope 7 therefrom. After the animal has been properly scalded the operating-rope 7 is disengaged from the rear portion of the basket and connected with the front portion thereof, preferably by means of a rope 31, similar in construction and arrangement to the rope 30. The operating-rope 7 passes beneath the cross-bar 6 instead of over said cross-bar, as in the first instance. The front pivot-bar 20 is released by disengaging the hooks 23 from the front ends of the bearing-blocks 21, and the latter are thrown back, so as to admit of the vertical movement of the pivot-bar 20 when winding up the rope 7 to turn the basket upon the rear platform 4. As the basket turns upon the rear pivot-bar 19 it is prevented from slipping rearward by reason of the bar 19 bearing against the front edge of the platform 4. After the animal has been dumped upon the platform 4 by the rearward tilting of the basket the latter is returned to the trough 17 for subsequent operation in the manner stated. The scraping, dressing, and quartering of the animal are performed upon the platform 4, and the pieces may be removed or suspended from the rack 15.

The apparatus is constructed in such a manner as to place the animal in the scalding-trough and remove it therefrom without endangering the life of the operator, and the lifting and hoisting are easily effected by means of the windlass, so that a single operator may readily perform the work of scalding and dressing of a heavy and bulky animal, thereby reducing the cost of preparing meat either for the market or home use.

Having thus described the invention, what is claimed as new is—

1. In butchering apparatus of the character described, and in combination with the frame structure having a scalding-trough and having bearings about in line with the front and the rear sides of the said trough, a basket adapted to enter the scalding-trough and having pivots at opposite sides mounted in the aforesaid bearings, and means for tilting the basket forward and rearward upon either of the said pivots, substantially as set forth.

2. In butchering apparatus, and in combination with the frame structure having a scalding-trough, and having bearings about in line with the front and the rear sides of the said trough, a basket adapted to enter said trough and having pivots at opposite sides to admit of the basket tilting bodily upon either of the said pivots into and from the trough, and means coöperating with the pivots and bearings to fix position of the pivots and prevent slipping of the basket during its tilting movements in either direction, substantially as set forth.

3. In butchering apparatus of the character described, and in combination with the frame structure having a scalding-trough, and having bearings about in line with the front and the rear sides of the said trough, a basket, bars at opposite sides of the basket about in the plane of the top thereof for coöperation with the aforesaid bearings to support the basket in the trough and to form axes for the basket to turn about, and connections between the bars and basket and forming extensions of certain elements or wires of the basket, substantially as described.

4. In butchering apparatus, a scalding-trough, a platform pivoted at one edge adjacent to the side of the trough, an apron attached to the outer end of the pivoted platform, and hoisting means for elevating the apron and pivoted platform and delivering the animal therefrom into the scalding-trough, substantially as set forth.

5. In butchering apparatus, a scalding-trough, a basket coöperating therewith, pivots at opposite sides of the basket, bearings for said pivots, a platform pivoted at one edge adjacent to the side of the trough, an apron attached to the outer end of the pivoted platform and adapted to receive the slaughtered animal, means for connecting the apron and basket, and means for tilting the basket, the parts being constructed to admit of the tilting of the basket upon the pivoted platform and the attachment of the outer end of the apron to the rear edge portion of the basket, substantially as and for the purpose set forth.

6. In butchering apparatus, and in combination with the scalding-trough, a tilting basket, bearings for the pivots of the basket, and means for tilting the basket, a platform pivoted at one edge adjacent to the side of the trough, an apron attached to the outer end of the pivoted platform and provided at its outer end with a rod, and hooks or attaching means applied to said rod for connecting the outer end of the apron with the rear edge portion of the basket, substantially as set forth.

In testimony whereof I affix my signature in presence of two witnesses.

MAX VOIGT. [L. S.]

Witnesses:
 LEWIS STUEHMER,
 F. FREEMAN.